(12) United States Patent
Zhang et al.

(10) Patent No.: US 10,996,679 B2
(45) Date of Patent: May 4, 2021

(54) METHOD TO EVALUATE TRAJECTORY CANDIDATES FOR AUTONOMOUS DRIVING VEHICLES (ADVS)

(71) Applicant: Baidu USA LLC, Sunnyvale, CA (US)

(72) Inventors: Yajia Zhang, Sunnyvale, CA (US); Kecheng Xu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 288 days.

(21) Appl. No.: 15/955,584

(22) Filed: Apr. 17, 2018

(65) Prior Publication Data

US 2019/0317512 A1 Oct. 17, 2019

(51) Int. Cl.
*G05D 1/02* (2020.01)
*G05D 1/00* (2006.01)

(52) U.S. Cl.
CPC ......... *G05D 1/0217* (2013.01); *G05D 1/0088* (2013.01); *G05D 1/0214* (2013.01); *G05D 1/0238* (2013.01); *G05D 2201/0213* (2013.01)

(58) Field of Classification Search
None
See application file for complete search history.

(56) References Cited

U.S. PATENT DOCUMENTS 6,341,255 B1 * 1/2002 Lapidot ................ G08G 1/0104
340/905
10,403,133 B1 * 9/2019 Christensen ....... G01C 21/3415
10,640,111 B1 * 5/2020 Gutmann ........... B60W 60/0011
2005/0273250 A1 * 12/2005 Hamilton ......... G08G 1/096716
701/532
2006/0122846 A1 * 6/2006 Burr ......................... G08G 1/20
342/357.31
2006/0155463 A1 * 7/2006 Adachi .................. G01C 21/32
701/461
2011/0035141 A1 * 2/2011 Barker ................ G08G 1/0104
701/119
2011/0098922 A1 * 4/2011 Ibrahim ................ G01C 21/32
701/532

(Continued)

FOREIGN PATENT DOCUMENTS

JP  2009137410  6/2009
JP  2011203795  10/2011
JP  2017016645  1/2017

*Primary Examiner* — Ryan Rink
(74) *Attorney, Agent, or Firm* — Womble Bond Dickinson (US) LLP

(57) ABSTRACT

In one embodiment, a system generates a plurality of trajectory candidates for an autonomous driving vehicle (ADV) from a starting point to an end point of a particular driving scenario. The system generates a reference trajectory corresponding to the driving scenario based on a current state of the ADV associated with the starting point and an end state of the ADV associated with the end point, where the reference trajectory is associated with an objective. For each of the trajectory candidates, the system compares the trajectory candidate with the reference trajectory to generate an objective cost representing a similarity between the trajectory candidate and the reference trajectory. The system selects one of the trajectory candidates as a target trajectory for driving the ADV based on objective costs of the trajectory candidates.

21 Claims, 14 Drawing Sheets

(56) References Cited

U.S. PATENT DOCUMENTS

| | | | |
|---|---|---|---|
| 2012/0226391 A1* | 9/2012 | Fryer | G01C 21/3407 |
| | | | 701/1 |
| 2014/0244151 A1* | 8/2014 | Matsubara | B60W 30/095 |
| | | | 701/301 |
| 2015/0344030 A1* | 12/2015 | Damerow | B60W 30/0956 |
| | | | 701/1 |
| 2016/0375901 A1* | 12/2016 | Di Cairano | G01C 21/3453 |
| | | | 701/26 |
| 2017/0138755 A1* | 5/2017 | Leff | G01S 19/393 |
| 2017/0343364 A1* | 11/2017 | Mutsuga | G08G 1/00 |
| 2018/0024553 A1* | 1/2018 | Kong | B60W 30/0953 |
| | | | 701/26 |
| 2018/0081360 A1* | 3/2018 | Bostick | G06Q 10/04 |
| 2018/0224866 A1* | 8/2018 | Alonso-Mora | G06N 5/04 |
| 2018/0237030 A1* | 8/2018 | Jones | B60W 50/082 |
| 2018/0238697 A1* | 8/2018 | Maru | G01C 21/3453 |
| 2018/0281191 A1* | 10/2018 | Sinyavskiy | A47L 11/4011 |
| 2018/0329411 A1* | 11/2018 | Levinson | G06Q 10/06 |
| 2019/0012909 A1* | 1/2019 | Mintz | H04W 4/024 |
| 2019/0156129 A1* | 5/2019 | Kakegawa | G06K 9/00805 |
| 2019/0204842 A1* | 7/2019 | Jafari Tafti | G06N 3/04 |
| 2019/0317508 A1* | 10/2019 | Zhang | G01C 21/3658 |

\* cited by examiner

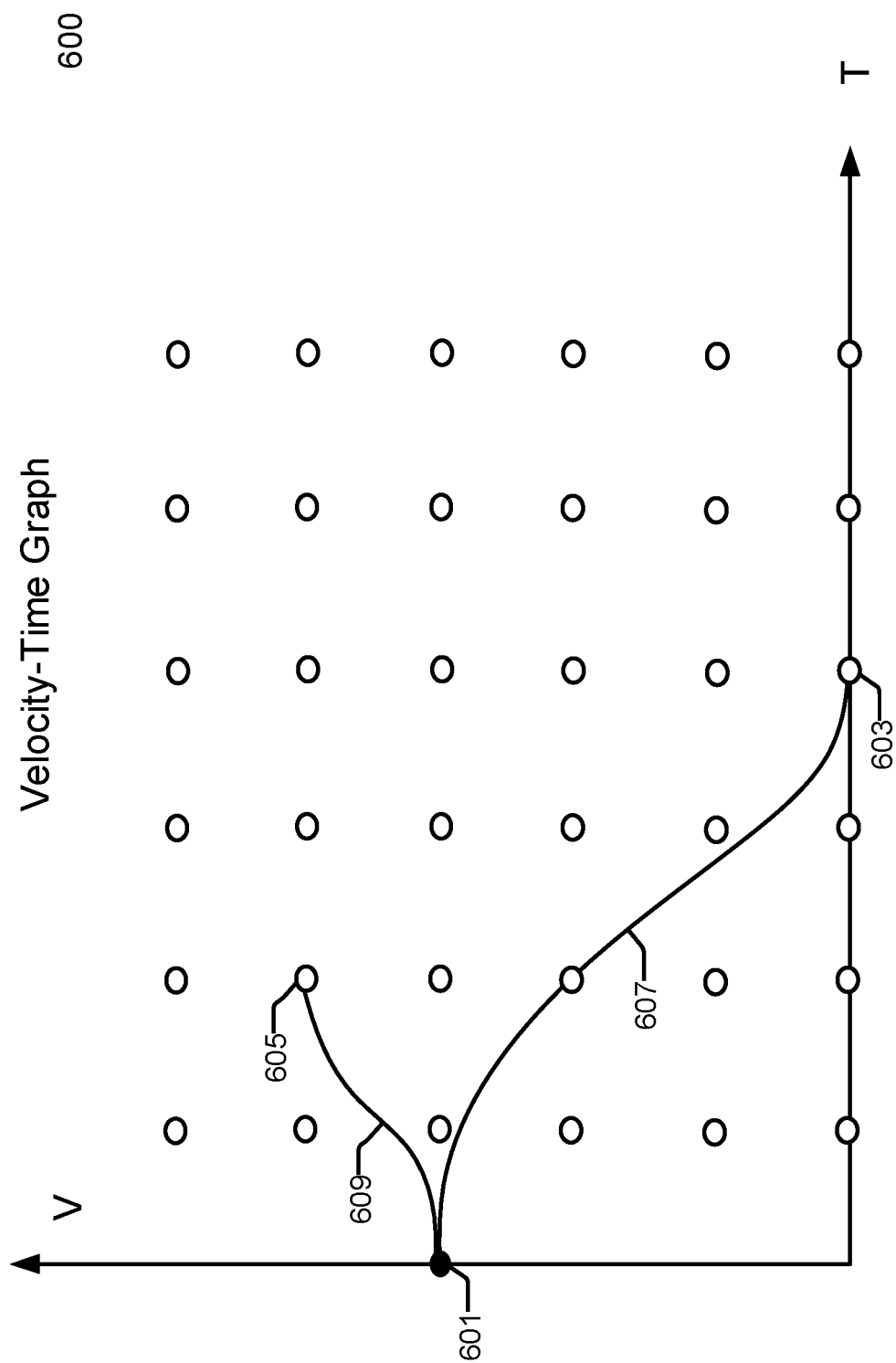

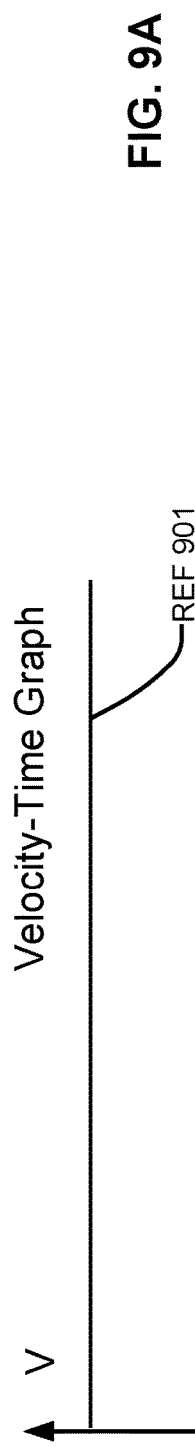
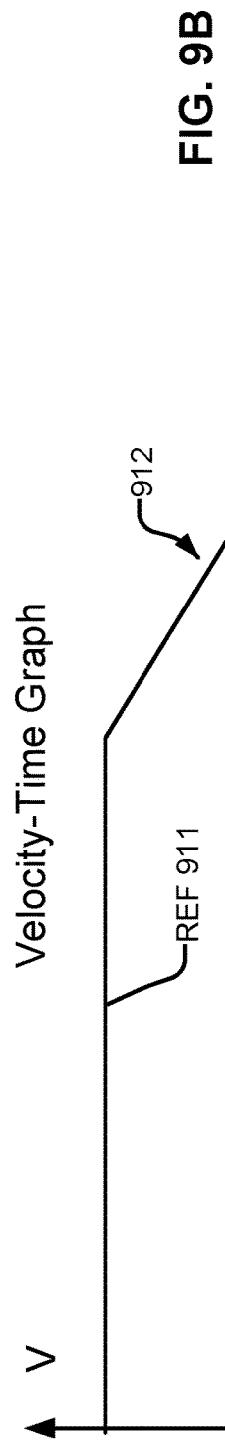

METHOD TO EVALUATE TRAJECTORY CANDIDATES FOR AUTONOMOUS DRIVING VEHICLES (ADVS)

TECHNICAL FIELD

Embodiments of the present disclosure relate generally to operating autonomous vehicles. More particularly, embodiments of the disclosure relate to methods to evaluate trajectory candidates for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An ADV can self-navigate using a driving trajectory. A driving trajectory can be divided into a longitudinal component and a lateral component. The longitudinal component or longitudinal trajectory refers to vehicle motions running lengthwise along a predetermined path (e.g., a station path). A longitudinal trajectory can determine a place, a speed, and acceleration for the ADV at a given point in time. Thus, longitudinal trajectory generation is a critical component for a semi or fully-autonomous driving vehicle.

There are several factors that need to be considered for a longitudinal trajectory generation process. Some factors can be: safety and comfort for onboard passengers of the ADV and/or nearby pedestrians, and traffic rule following factors. To achieve a safe operation of the ADV, a trajectory generation process needs to account for obstacles in the surrounding environment. For a comfortable operation, the trajectories need to be to be a smooth and efficient trajectory, i.e., trajectories with graceful accelerations which can maneuver an ADV from a current location to a destination within a reasonable time. Lastly, the trajectories need to follow local traffic rules, i.e., stop at red signal lights and stop signs, etc. There has been a lack of efficient ways to generate a trajectory considering all of these factors appropriately.

BRIEF DESCRIPTION OF THE DRAWINGS

Embodiments of the disclosure are illustrated by way of example and not limitation in the figures of the accompanying drawings in which like references indicate similar elements.

FIG. 6A is an example of a velocity-time graph illustrating a number of trajectories according to one embodiment.

FIGS. 9A-9C are examples of reference velocity curves according to some embodiments.

DETAILED DESCRIPTION

Figure 1:
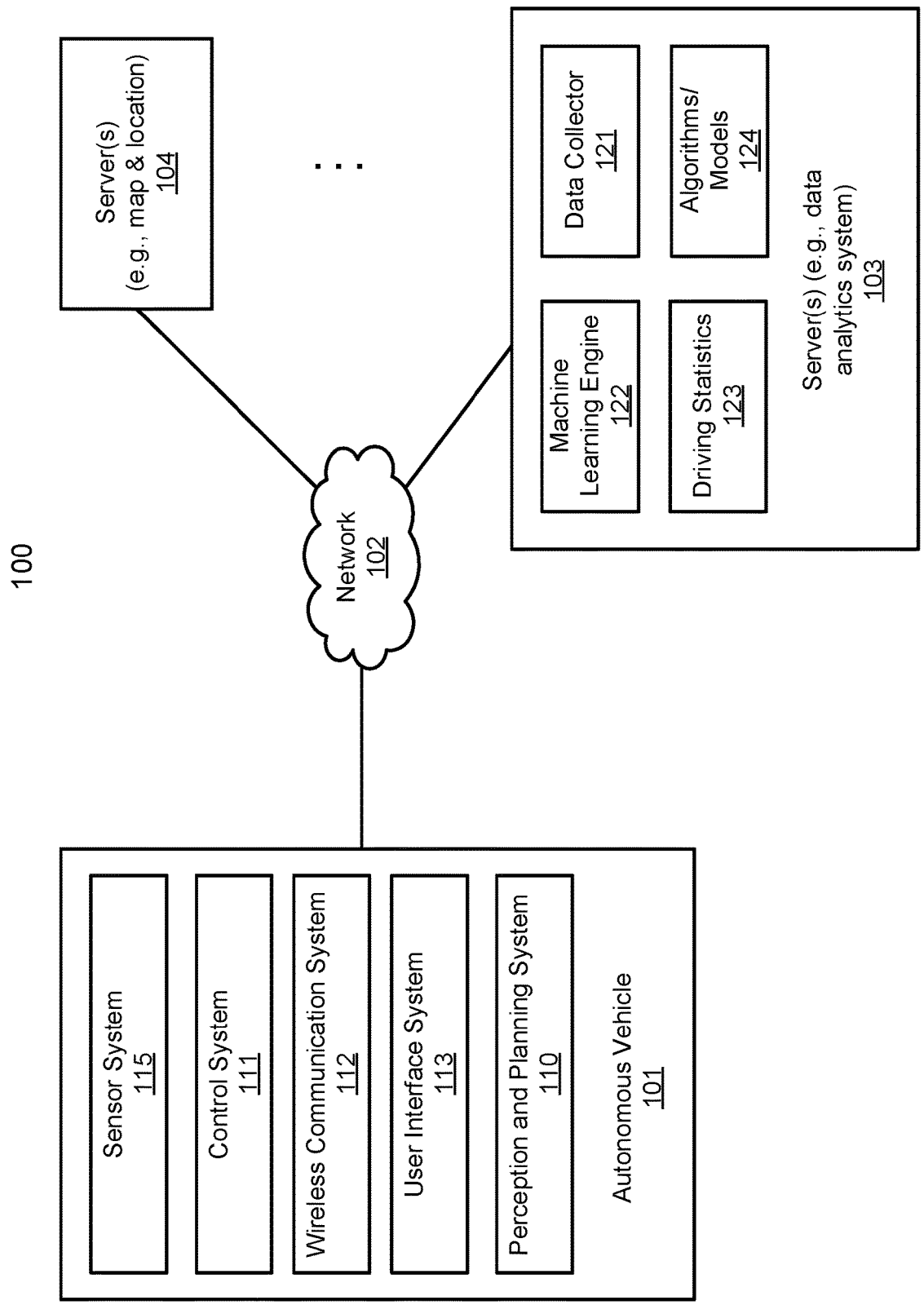
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one aspect, a system generates a plurality of trajectory candidates for an autonomous driving vehicle (ADV) from a starting point to an end point of a particular driving scenario. The system generates a reference trajectory corresponding to the driving scenario based on a current state of the ADV associated with the starting point and an end state of the ADV associated with the end point, where the reference trajectory is associated with an objective. For each of the trajectory candidates, the system compares the trajectory candidate with the reference trajectory to generate an objective cost representing a similarity between the trajectory candidate and the reference trajectory. The system selects one of the trajectory candidates as a target trajectory for driving the ADV based on objective costs of the trajectory candidates.

In comparing each trajectory candidate with the reference trajectory, according to one embodiment, the trajectory candidate into a number of candidate segments. The reference trajectory is segmented into a number of reference segments. For each trajectory segment, a velocity difference between the velocity of the candidate segment and the corresponding reference segment is determined. That is, velocities of a candidate segment and a reference segment corresponding to the same point in time are compared. The objective cost is calculated based on the velocity differences between the candidate segments and the associated reference segments, for example, using a predetermined algorithm. In a particular embodiment, the objective cost is calculated by summing squared velocity differences between the trajectory segments and the reference segments.

According to another aspect, for each of the trajectory candidates, an obstacle closest to the trajectory candidate is identified. A distance between the trajectory candidate and the obstacle is measured. A safety cost associated with the trajectory candidate is calculated based on the distance between the trajectory candidate and the obstacle, for example, using a safety cost algorithm or function. A total trajectory cost for the trajectory candidate is then calculated based on the objective cost and the safety cost. The target trajectory is selected from the trajectory candidates based on the total trajectory cost, e.g., the lowest total trajectory cost.

According to a further aspect, for each of the trajectory candidates, a changing rate of the acceleration along the trajectory candidate is determined. The acceleration changing rate can be determined based on a derivative of the speed along the trajectory candidate. A comfort cost for the trajectory candidate is then calculated based on the acceleration changing rate, for example, using a comfort cost algorithm or function. The total trajectory cost is then calculated based on the objective cost and the comfort cost and the target trajectory can be selected based on the total trajectory cost.

In calculating a comfort cost of a trajectory candidate, according to one embodiment, the trajectory candidate is segmented into a number of candidate segments. For each candidate segment, a segment comfort cost for the candidate segment is calculated based on a changing rate of the acceleration associated with the candidate segment. The comfort cost is then calculated based on the segment comfort costs of all the candidate segments using a predetermined algorithm. In a particular embodiment, the comfort cost is calculated based on a sum (e.g., a squared sum) of the segment comfort costs of the candidate segments.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
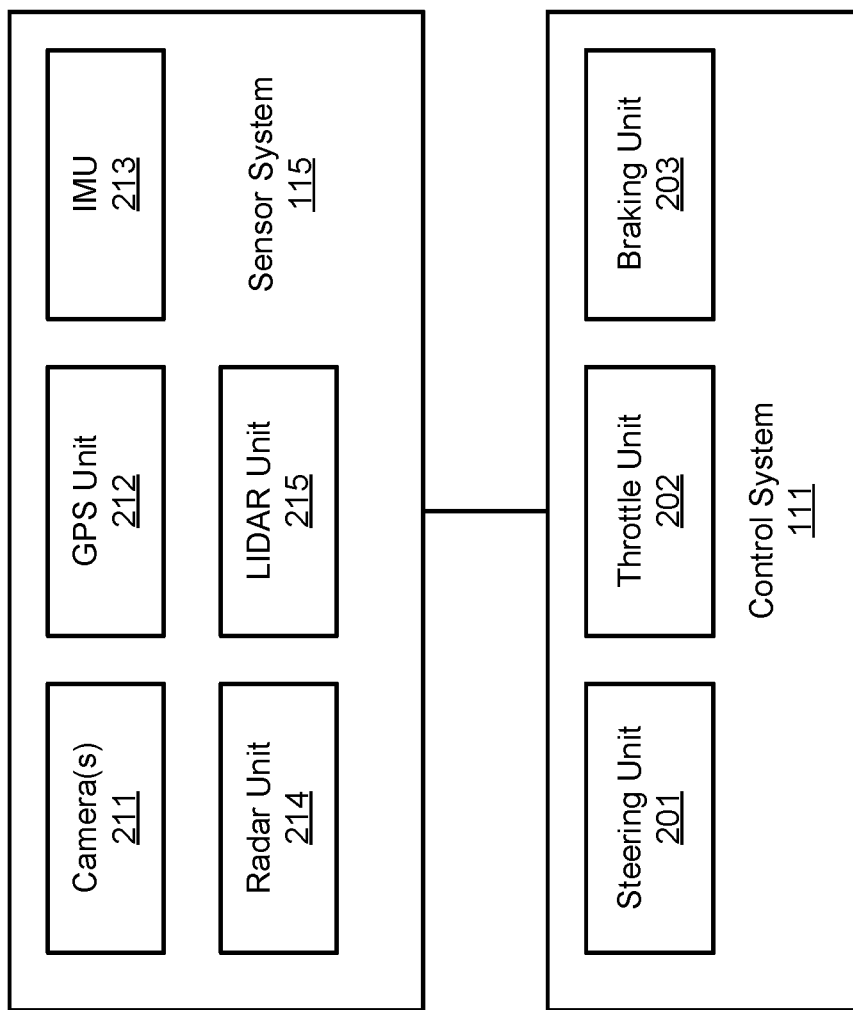
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, weather conditions, and road conditions, such as slow traffic on freeway, stopped traffic, car accident, road construction, temporary detour, unknown obstacles, etc.

Based on driving statistics 123, machine learning engine 122 generates or trains a set of rules, algorithms, and/or models 124 for a variety of purposes, including trained models to determine if an obstacle detected by sensors of the ADV is a stop sign or a traffic light. Rules/algorithms 124 may further include traffic rules for the ADV to follow and algorithms to calculate a quartic and/or a quintic polynomial for a trajectory. Algorithms 124 may further include algorithms to generate trajectory candidates as a final trajectory. Algorithms 124 may further include algorithms to calculate trajectory costs for selecting a target trajectory from the trajectory candidates, including algorithms to calculate objective costs, safety costs, and comfort costs. Algorithms 124 can then be uploaded onto ADVs for real-time trajectory generation for autonomous driving.

Figure 3A:
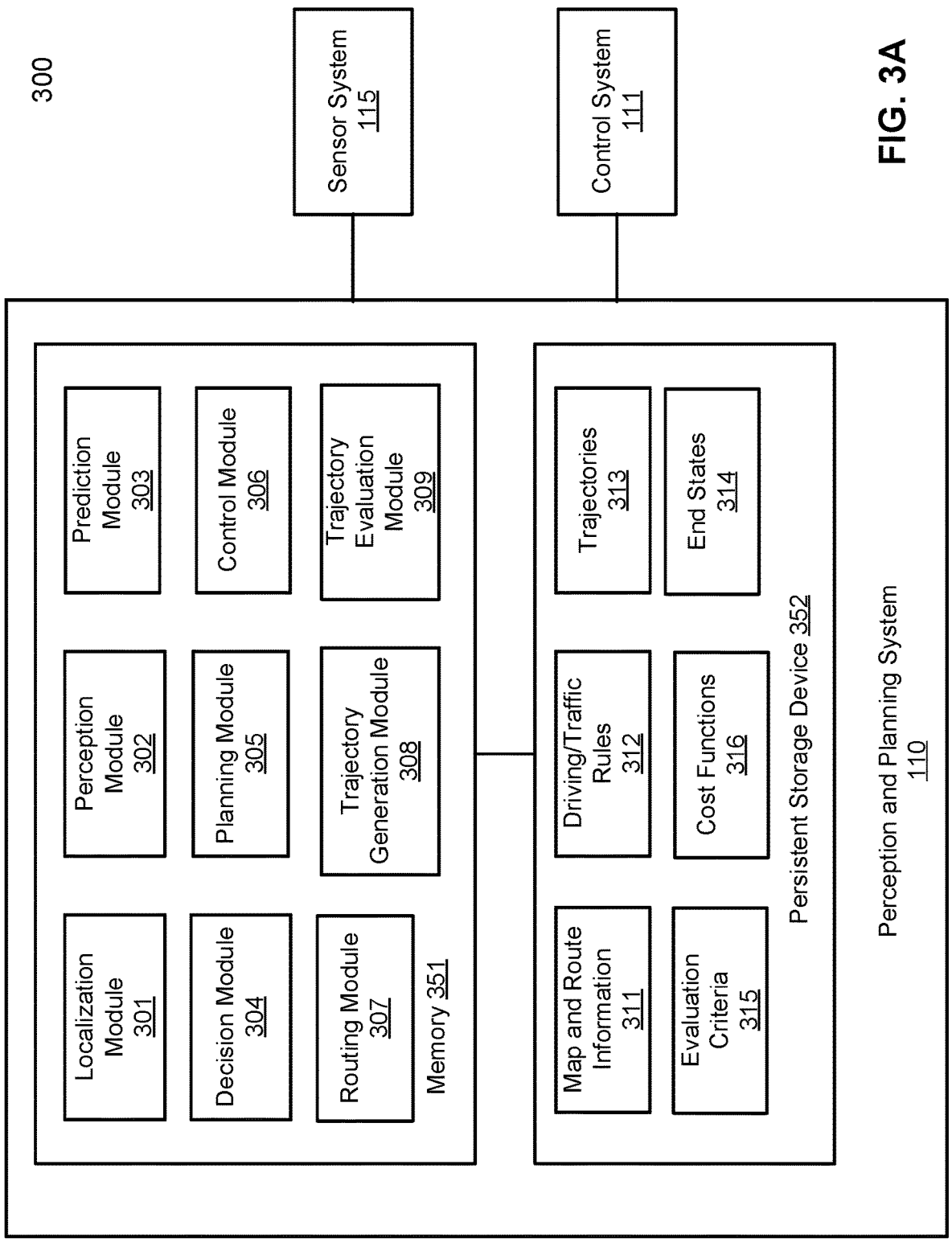
FIGS. 3A-3B are block diagrams illustrating an example of a perception and planning system used with an autonomous vehicle according to one embodiment.
Figure 3B:
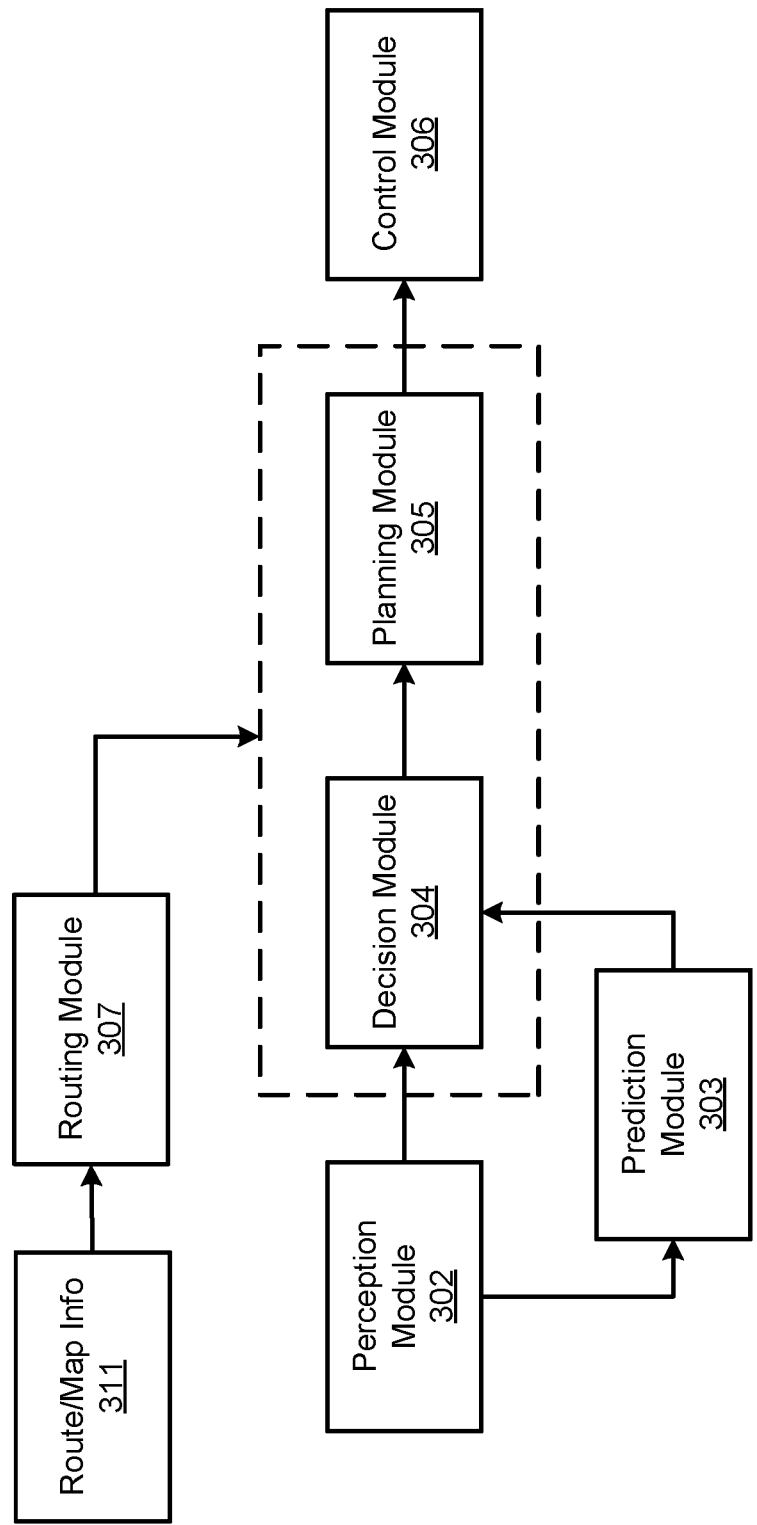

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, trajectory generation module 308, and trajectory evaluation module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module. For example, trajectory generation module 308 and/or trajectory evaluation module 309 may be implemented as a part of decision module 304 and/or planning module 305. Decision module 304 and planning module 305 may be an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to entering the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal route in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

The planning phase may be performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. For example, planning module 305 may plan a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, trajectory generation module 308 can generate longitudinal trajectory candidates for ADV 101. The trajectory candidates may be generated in view of factors such as safety, comfort, and traffic rules. Trajectory evaluation module 309, also referred to as trajectory selection module, can then select one of the generated trajectory candidates as the trajectory to control the ADV based on evaluation criteria 315 and using cost functions 316. Trajectory selection processes will be described in details further below. Trajectory generation module 308 may be implemented as part of decision module 304 and/or planning module 305. In one embodiment, trajectory generation module 308 can, in response to perceiving an environment, generate in real-time a station-time graph. Trajectory generation module 308 can then projects any perceived obstacles in that instance onto the station-time graph. Based on a boundary of the projected obstacles, end conditions can be enumerated. Trajectory candidates can then be generated based on these end conditions. A trajectory candidate can be selected as a final trajectory to control the ADV.

Figure 4:
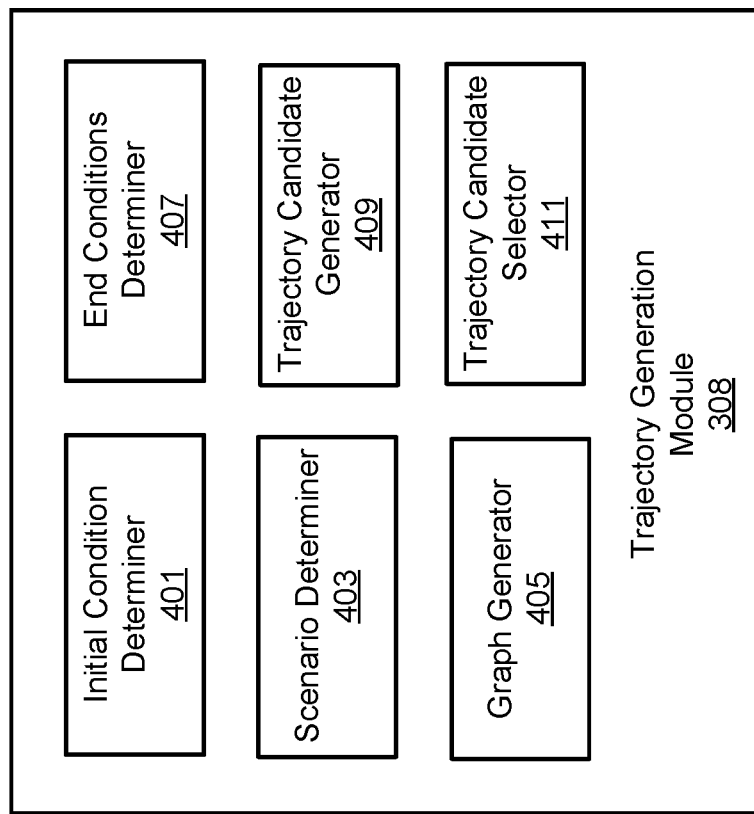
FIG. 4 is a block diagram illustrating an example of a trajectory generation module according to one embodiment.

FIG. 4 is a block diagram illustrating an example of a trajectory generation module according to one embodiment. Referring to FIG. 4, trajectory generation module 308 can include initial condition determiner 401, scenario determiner 403, graph generator 405, end conditions determiner 407, trajectory candidate generator 409, and trajectory candidate selector 411. Initial condition determiner 401 can determine an initial condition for the ADV. Scenario determiner 403 can determine a driving scenario for the ADV in view of obstacles perceived by the ADV. Graph generator 405 can generate a station-time graph and/or a velocity-time graph for the ADV. End conditions determiner 407 can determine all possible end conditions for the ADV based on a driving scenario and the initial condition of the ADV and other factors such as safety, comfort, and traffic rules. Trajectory candidate generator 409 can generate trajectory candidates from the possible ends conditions. Trajectory candidate selector 411 can select a trajectory candidate from a pool of trajectory candidates.

Figure 5:
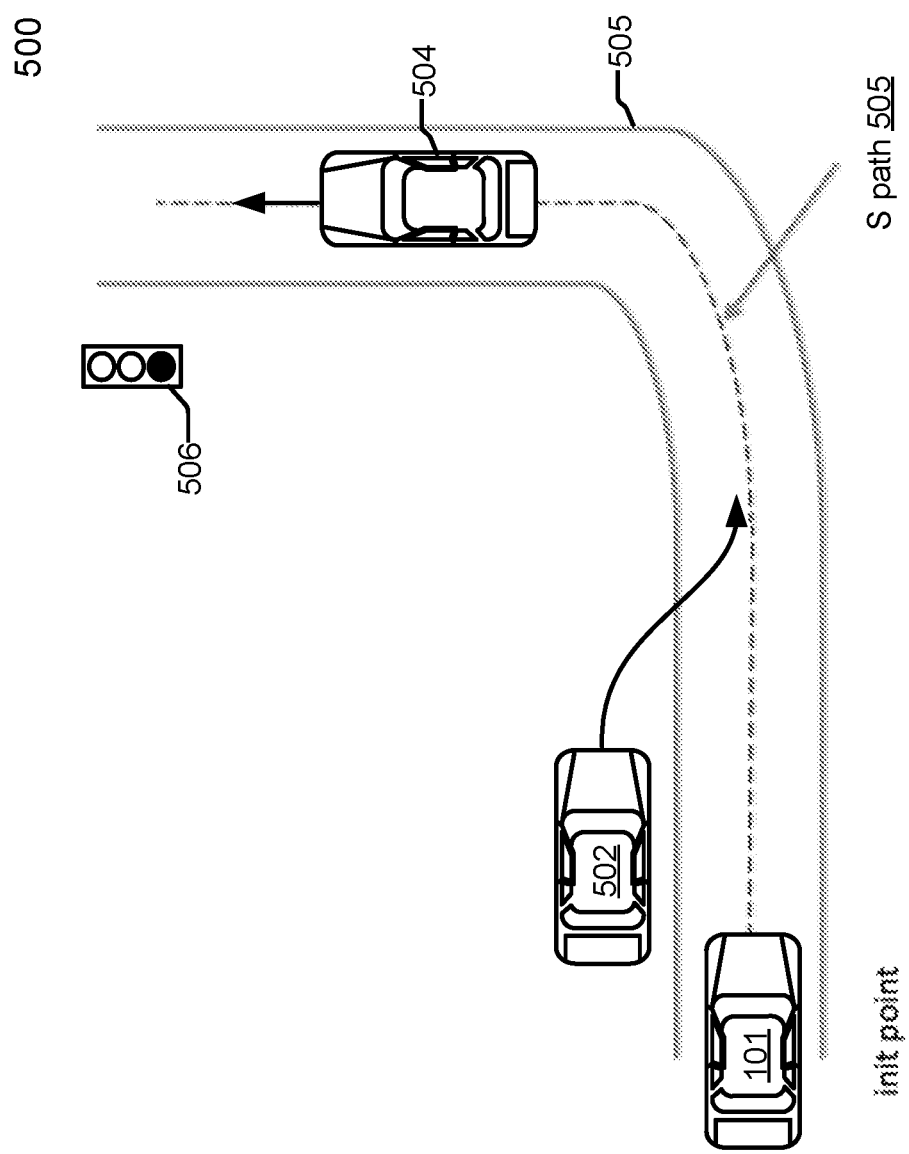
FIG. 5 is a block diagram illustrating an example scenario for an ADV according to one embodiment.

FIG. 5 is a block diagram illustrating an example of a scenario for an ADV according to one embodiment. Referring to FIG. 5, scenario 500 includes ADV 101 along path 505. Path 505 may be a path (or a segment of a path) predetermined by decision 304 and/or planning module 305 which can maneuver ADV 101 from an initial point to a final destination. ADV 101 can perceive a surrounding environment including vehicle 504 ahead, a red traffic light 506 ahead, and vehicle 502 (which may be predicted, by prediction module 303 of ADV 101, to have some chance to swerve in front of ADV 101).

Referring to FIGS. 4-5, in one embodiment, an initial condition determiner, such as initial condition determiner 401 of ADV 101, can determine an initial condition of ADV 101 based on a current vehicle state. A vehicle state can include a position, a velocity, acceleration, a curvature (e.g., heading direction), and a curvature change rate of the ADV. Here, initial condition determiner 401 can determine an initial (e.g., current) condition for a longitudinal position (s_init), a longitudinal velocity (s_dot_init), and a longitudinal acceleration (s_ddot_init) of ADV 101.

Based on the initial condition, in one embodiment, graph generator 405 generates a longitudinal velocity-time (or velocity-time or VT) graph having a predetermined time period, i.e., a maximum planning time interval for the current planning cycle (e.g., 100-200 ms). FIG. 6A is an example of a velocity-time graph according to an embodiment. FIG. 6A can be a velocity-time graph generated by graph generator 405 to correspond to scenario 500 of FIG. 5. Referring to FIG. 6A, VT graph 600 includes initial point 601 and a number of end points (such as points 603-605) correspond to a number of possible end conditions. In one embodiment, the number of end conditions can be enumerated based on fixed time intervals and/or speed increments. In another embodiment, the number of end conditions can be enumerated based on a time interval predefined by a user. In another embodiment, the number of end conditions can be capped by map information and/or traffic rules, such as a maximum and/or a minimum speed limit for a stretch of road.

Referring to FIG. 6A, point 601 can correspond to an initial longitudinal velocity (e.g., s_dot_init) for ADV 101, at time t=0. Points 603 and 605 can correspond to two enumerated end conditions, which can represent end points of two possible trajectory candidates. Point 603 can correspond to an end condition having a velocity of zero after some time and point 605 can correspond to an end condition having a higher velocity than the initial longitudinal velocity after some time. The end conditions generated using the velocity-time graph can represent a first group (or a second set) of end conditions. Each of the end conditions in the first group (or the second set) can correspond to an end longitudinal velocity (s_dot_end) and longitudinal acceleration (s_ddot_end). Note, in some embodiments, end longitudinal acceleration is always equal to zero.

Next, scenario determiner 403 determines a current driving scenario for ADV 101. In one embodiment, the possible driving scenarios include, but are not limited to: cruise, follow a leading vehicle, and stop scenarios. A current driving scenario can be determined based on a current traffic condition along path 505, for example, by perception module 302 and/or prediction module 303, which can be determined based on the identified obstacles along path 505. For example, if a planned path of ADV 101 is without any obstacles, then the driving scenario can be a cruise scenario. If a planned path of ADV 101 includes both static (e.g., non-moving) and dynamic (e.g., moving) obstacles, such as a stop sign and a moving vehicle, then the driving scenario can be a follow a leader vehicle scenario. If a planned path includes only static obstacles, e.g., stop signs and/or traffic lights, then the driving scenario can be a stop scenario. Here, scenario 500 includes both static and dynamic obstacles and a current driving scenario can be determined to be a follow scenario.

In one embodiment, graph generator 405 generates a station-time graph for a follow or a stop scenario but not for a cruise scenario. A cruise scenario may not be associated with a station-time graph (also referred to as a path-time graph or a path-time space) because there are no perceived obstacles in a cruise scenario. In one embodiment, for a follow or a stop scenario, graph generator 405 generates a path-time (or station-time) graph based on the initial condition. The station-time graph is generated for a predetermined time period, such that there is enough time to take into account the possible longitudinal trajectories of the ADV until a next planning cycle. In one embodiment, graph generator 405 generates geometric regions for obstacles perceived by ADV 101 by projecting these obstacles onto the generated station-time graph. These regions in the path-time space may include projections for static and dynamic obstacles such as predicted trajectories of another vehicle (e.g., vehicle 502) swerving into path 505.

Figure 6B:
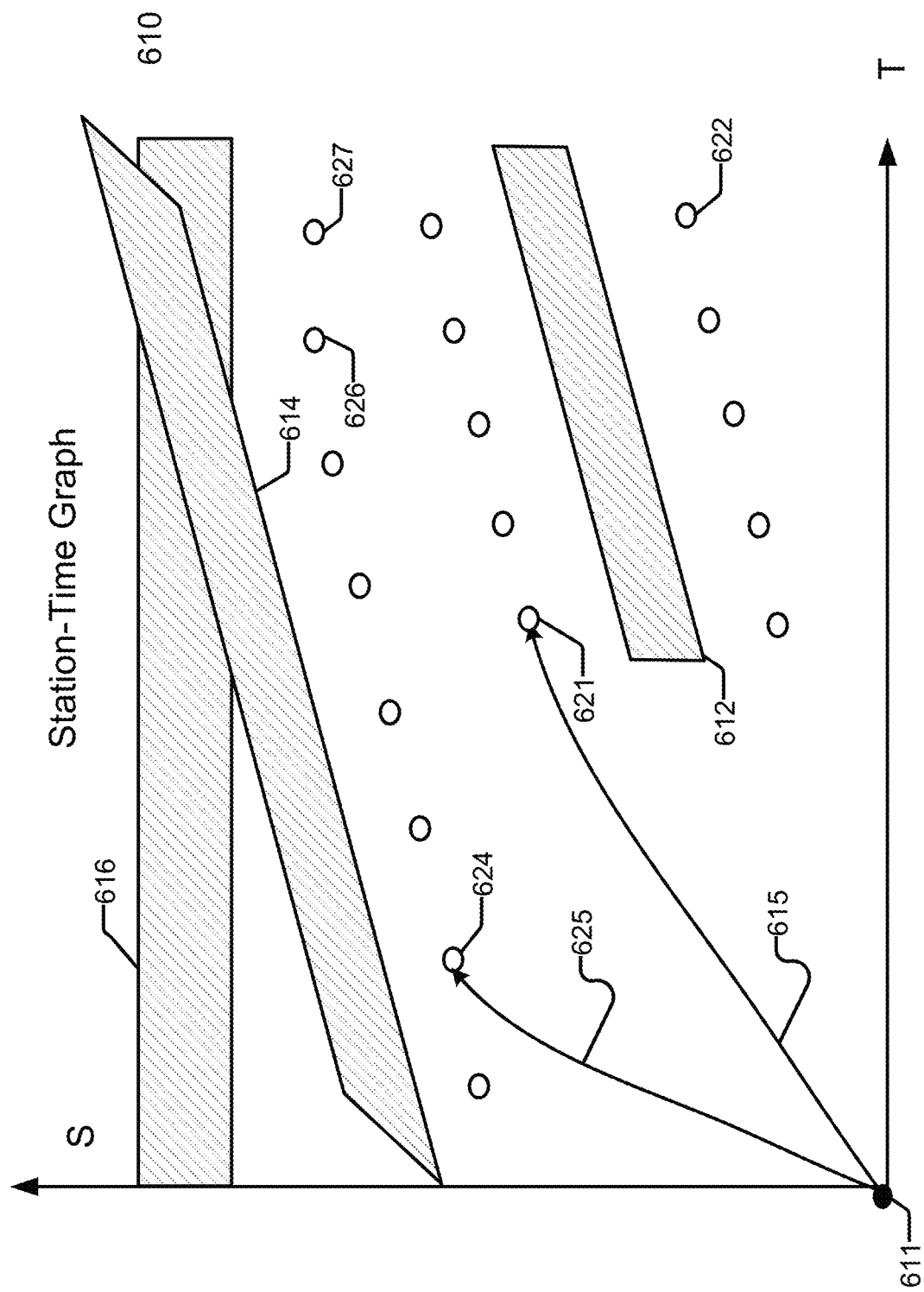
FIG. 6B is an example of a station-time graph illustrating a number of trajectories according to one embodiment.

FIG. 6B shows an example of a station-time graph according to an embodiment. FIG. 6B can be a station-time graph generated by graph generator 405 to correspond to scenario 500 of FIG. 5. Referring to FIG. 6B, for example, point 611 can correspond to s_init of ADV 101. Graph generation 405 can generate station-time obstacles (e.g., regions) 612, 614, and 616. Region 612 can correspond to obstacle (or vehicle) 502 which may be predicted to swerve in front of ADV 101. Region 614 can correspond to vehicle 504 cruising ahead of ADV 101 and region 616 can correspond to red traffic light 506.

Next, end conditions determiner 407 can enumerated end conditions based on the generated station-time graph. In one embodiment, end conditions can be enumerated based on a boundary of each of the regions in the station-time graph. In another embodiment, end conditions can be enumerated based on only an upper and/or a lower boundary of each of the regions in the station-time graph. For example, ST points 621-622 along the upper and/or the lower boundary of region 612 can be enumerated as end conditions for region 612. ST point 624 along a lower boundary of region 614 can be enumerated as an end condition for region 614. ST points 626-627 along a lower boundary of region 616 can be enumerated as end conditions for region 616. Here, because ADV 101 would violate a traffic rule and/or hit an obstacle if ADV 101 touches or intersects regions 612, 614, 616, end conditions lying on regions 612, 614, 616 need not be enumerated. In one embodiment, the number of end conditions can be enumerated based on fixed time intervals. In another embodiment, the number of end conditions can be enumerated based on a time interval predefined by a user. The generated end conditions using the station-time graph can represent a second group (or a first set) of end conditions. Each of the end conditions in the second group (or the first set) can correspond to an end station position (s_end), longitudinal velocity (s_dot_end), and longitudinal acceleration (s_ddot_end). Note, in some embodiments, end longitudinal acceleration is always equal to zero.

Once the second group (or the first set) of end conditions is determined, in one embodiment, trajectory candidate generator 409 generates a number of trajectory candidates based on the end conditions from the first group (or the second set) and the second group (or the first set) by curve fitting these end conditions with their corresponding initial conditions to a quartic (4$^{th}$ order) and/or a quintic (5$^{th}$ order) polynomial using a curve fitting algorithm for smoothness. Referring to FIG. 6A (e.g., the VT graph), for example, trajectory candidate generator 409 can generate trajectory candidates 609 by applying a curve fitting algorithm to fit a quartic polynomial to initial point 601 and end point 605. In another example, referring to FIG. 6B (e.g., the ST graph), trajectory candidate generator 409 can generate trajectory candidate 615 by applying a curve fitting algorithm to fit a quintic polynomial to initial point 611 and end point 621. For this example, trajectory candidate 615 corresponds to ADV 101 overtaking a predicted trajectory of vehicle 502.

Once trajectory candidates are generated from all possible end conditions, in one embodiment, an evaluation module, such as evaluation module 309 of FIG. 3A, evaluates each of the trajectory candidates for a best trajectory candidate. Trajectory candidate selector 411 can then select this best trajectory candidate to control the ADV.

Referring back to FIG. 3A, trajectory evaluation module 309 may be implemented in software, hardware, or a combination thereof. For example, trajectory evaluation module 309 may be installed in persistent storage device 352, loaded into memory 351, and executed by one or more processors (not shown). The trajectory evaluation module 309 may be communicatively coupled to or integrated with some or all modules of vehicle control system 111 of FIG. 2. In one embodiment, trajectory evaluation module 309 and trajectory generation module 308 may be an integrated module.

Figure 7:
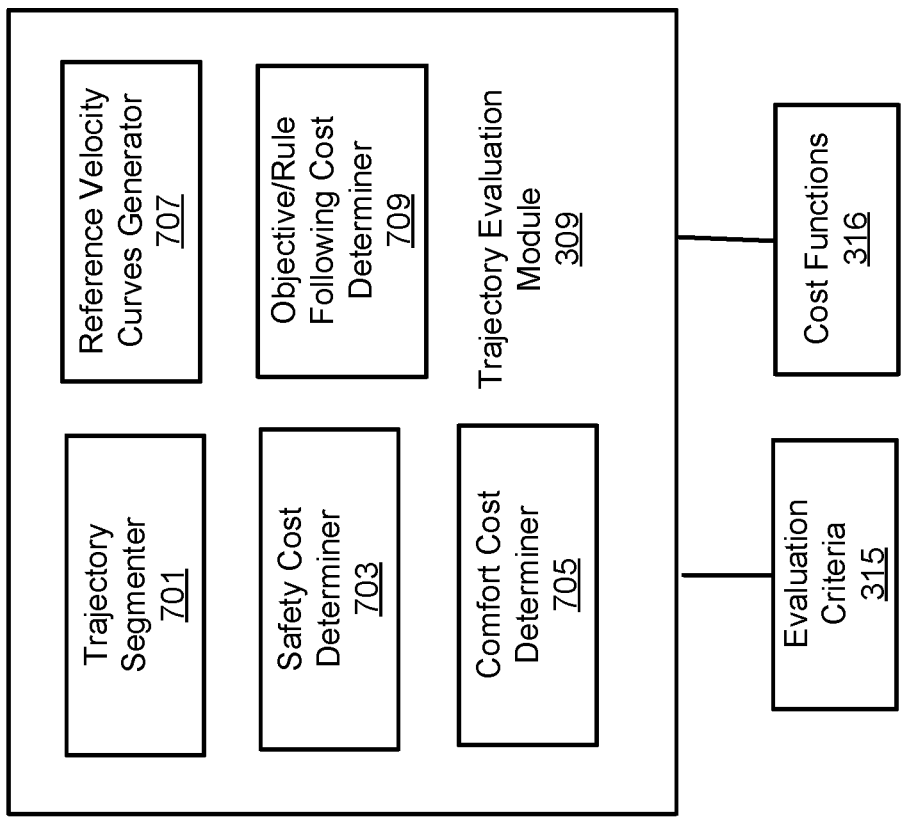
FIG. 7 is a block diagram illustrating an example of a trajectory evaluation module according to one embodiment.

FIG. 7 is a block diagram illustrating an example of a trajectory evaluation module according to one embodiment. Referring to FIG. 7, trajectory evaluation module 309 can evaluate trajectory candidates based on cost functions to evaluate trajectory candidates for selection of a best trajectory to control an ADV. Trajectory evaluation module 309 can include trajectory segmenter 701, comfort cost determiner 703, safety cost determiner 705, reference velocity curves generator 707, and objective/rule following cost determiner 709. Trajectory segmenter 701 can segment a candidate trajectory into a number of segments. Comfort cost determiner 705 can determine a comfort cost for a candidate trajectory. Safety cost determiner 703 can determine a safety cost for a candidate trajectory. Reference velocity curves generator 707 can generate reference velocity-time curves (which follows traffic rules) to evaluate an objective following cost for a candidate trajectory. Objective/rule following cost determiner 709 can determine an objective cost for a candidate trajectory.

A number of criteria (or costs) can be considered for evaluation of trajectory candidates, such as, for example, safety, comfort, rule following, and/or objective following criteria, which may be defined as a part of evaluation criteria 315. A safety cost can be calculated by considering whether the trajectory candidate will lead the autonomous vehicle to collide with other vehicles/obstacles in the road. A comfort cost can be calculated by considering whether passengers the ADV will have a comfortable riding experience when the ADV uses the trajectory candidate. A rule following cost can be calculated by considering whether the autonomous vehicle obeys traffic rules. For example, it requires the vehicle to stop at certain places, e.g., before stop signs and/or red traffic lights, etc. An objective following cost can calculated by considering whether the ADV will finish the transportation task in a timely manner, i.e., whether the trajectory candidate can transport passengers to a destination without spending an excessive time. In one embodiment, the different evaluation criteria can be modeled as cost functions 316. An example cost function (or overall cost function) can be cost_overall=sum (costs*weight), where costs can be a cost for comfort, safety, rule following, and/or objective following, and weight is a weighting factor for each of the corresponding costs.

Figure 8:
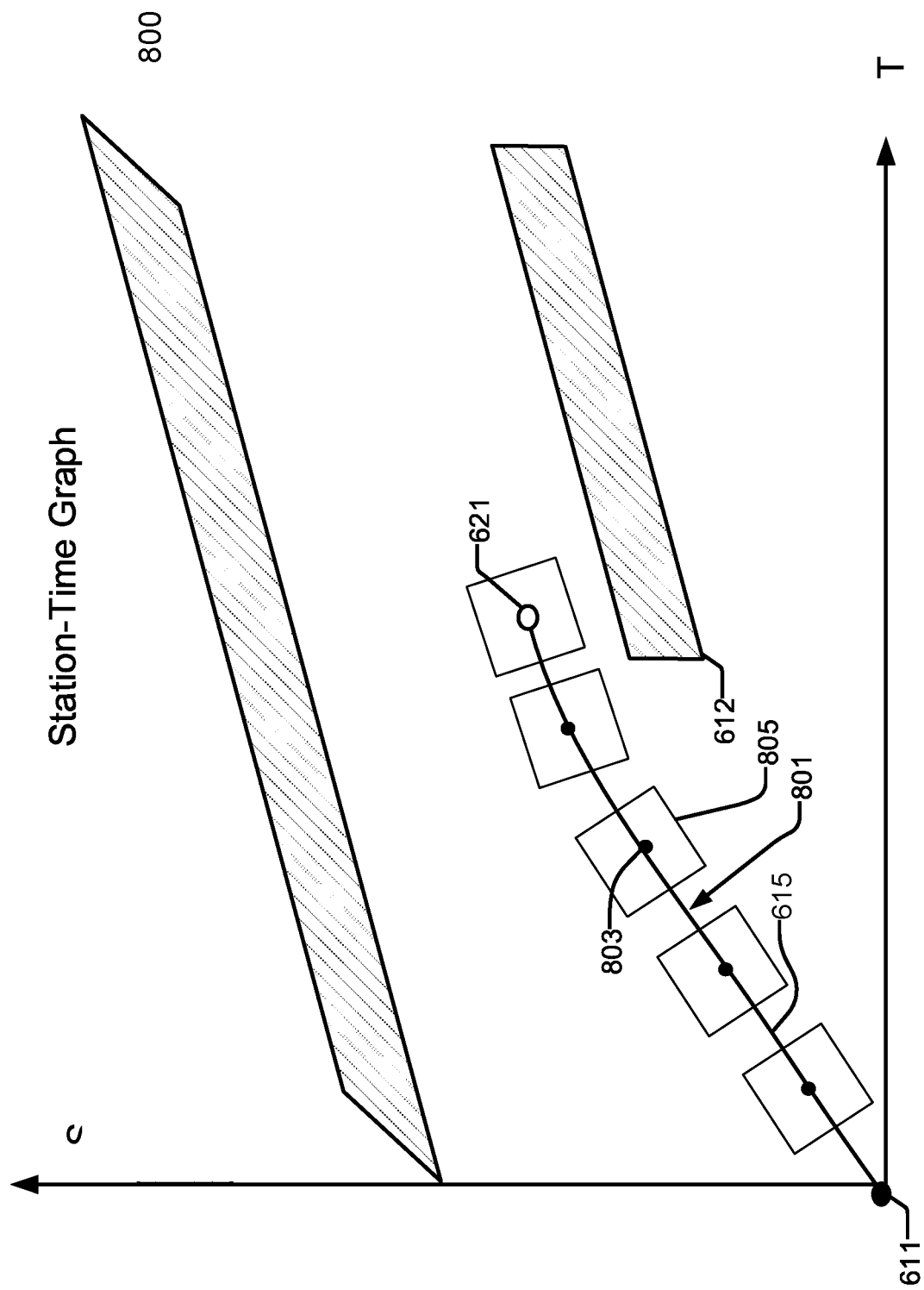
FIG. 8 is an example of a station-time graph illustrating a trajectory candidate according to one embodiment.

Referring to FIGS. 7 and 8, in one embodiment, a safety cost can be evaluated (via safety cost determiner 703) using a station-time graph, such as station-time graph 800 of FIG.

8. Station-time graph 800 can be station-time graph 610 of FIG. 6B having obstacles 612, 614, 616, and trajectory candidate 615 to be evaluated for safety. In one embodiment, trajectory candidate 615 is segmented, by trajectory segmenter 701, into a number of segments 801 according to a predetermined time resolution. Each of the segments 801 can have an associated end point 803 (e.g., a timestamp). Trajectory segmenter 701 then bounds end points 803 (or timestamps) with boxes 805. Boxes 805 can have a predetermined width that can represent a width of the ADV. In one embodiment, safety cost determiner 703 traverses each of the boxes 805 to determine if any edges of boxes 805 would intersect a boundary of any static/dynamic obstacles in station-time graph 800, e.g., obstacles 612, 614, 616. If there is an intersection (e.g., a possible collision) then the trajectory candidate may be removed from selection. In another embodiment, a closest distance from trajectory candidate 615 to any boundaries of obstacles 612, 614, 615 can be calculated along all timestamps of trajectory candidate 615. The safety cost can be an inverse of the calculated distance, e.g., a closer distance has a higher cost. In this case, a trajectory candidate which is far away from surrounding obstacles, e.g., a lower cost, may be deemed safer than a trajectory candidate which may be closer to the surrounding obstacles.

A comfort cost can be determined (via comfort cost determiner 705) by calculating a sum value for jerk for each of the time periods, such as a squared sum. Jerk is defined as a change in acceleration of the ADV. Here, a jerk value can be computed by calculating a change of acceleration over the time period for neighboring timestamps, e.g., end points 803. The jerk values for each time period are then squared and summed together for a comfort cost.

To determine the objective/rule following cost (also simply referred to as an objective cost), in one embodiment, a reference velocity curve must first be generated. A reference velocity is an ideal speed curve for an ADV absent any obstacles. In other words, a reference velocity curve is a velocity curve in which the ADV should strive to achieve. Without a reference velocity curve, ADV 101 would have no reference speeds to compare with and ADV 101 can be in standstill and would still satisfy the safety and comfort evaluation criteria, e.g., ADV 101 not in motion will be safe and comfortable. However with a reference velocity curve to follow, ADV 101 can strive to arrive at a predefined destination in the least amount of time while ensuring a comfortable drive.

To generate a reference velocity curve, in one embodiment, there are at least two scenarios to be considered. A first scenario is where there is no obstacle and the objective of the ADV is to cruise at a steady speed, e.g., v_cruise. In this case, reference curve generator 707 can generate a reference velocity curve to be a constant speed curve such as curve 900 of FIG. 9A. In one embodiment, the constant speed or the cruise speed is determined based on a road speed limit. In another embodiment, the constant speed or the cruise speed is determined based on a speed predefined by a user of the ADV. For a second scenario where there is an obstacle corresponding to a stopping point, i.e., the ADV needs to stop at a point with a known position, reference curve generator 707 can determine a comfortable deceleration d_comf, which can be a maximal deceleration d_max of the vehicle times a predetermined comfort factor f. Based on d_comf, reference curve generator 707 can compute a deceleration trajectory (e.g., 912 of FIG. 9B) that can slow down the ADV with the comfortable decleration, e.g., d_comf, and stop the ADV at the known stopping point.

In one embodiment, based on the calculated deceleration trajectory (e.g., 912), if the ADV cannot slowdown from a cruise speed v_cruise using d_comf then reference curve generator 707 generates a constant deceleration trajectory from the current position of the ADV to the stop point. Reference velocity curve 921 of FIG. 9C is an example of such a reference velocity curve.

In another embodiment, based on the calculated deceleration trajectory (e.g., 912), if ADV can slowdown from a cruise speed v_cruise using d_comf then reference curve generator 707 generates a curve with a constant speed trajectory (e.g., v_cruise) in a first portion, followed by a constant decelerating trajectory (e.g., 912) in a second portion. Reference velocity curve 911 of FIG. 9B is an example of such a reference velocity curve. Once the reference speed curve is generated for a trajectory candidate, the objective/rule following cost can then be determined.

Figure 10:
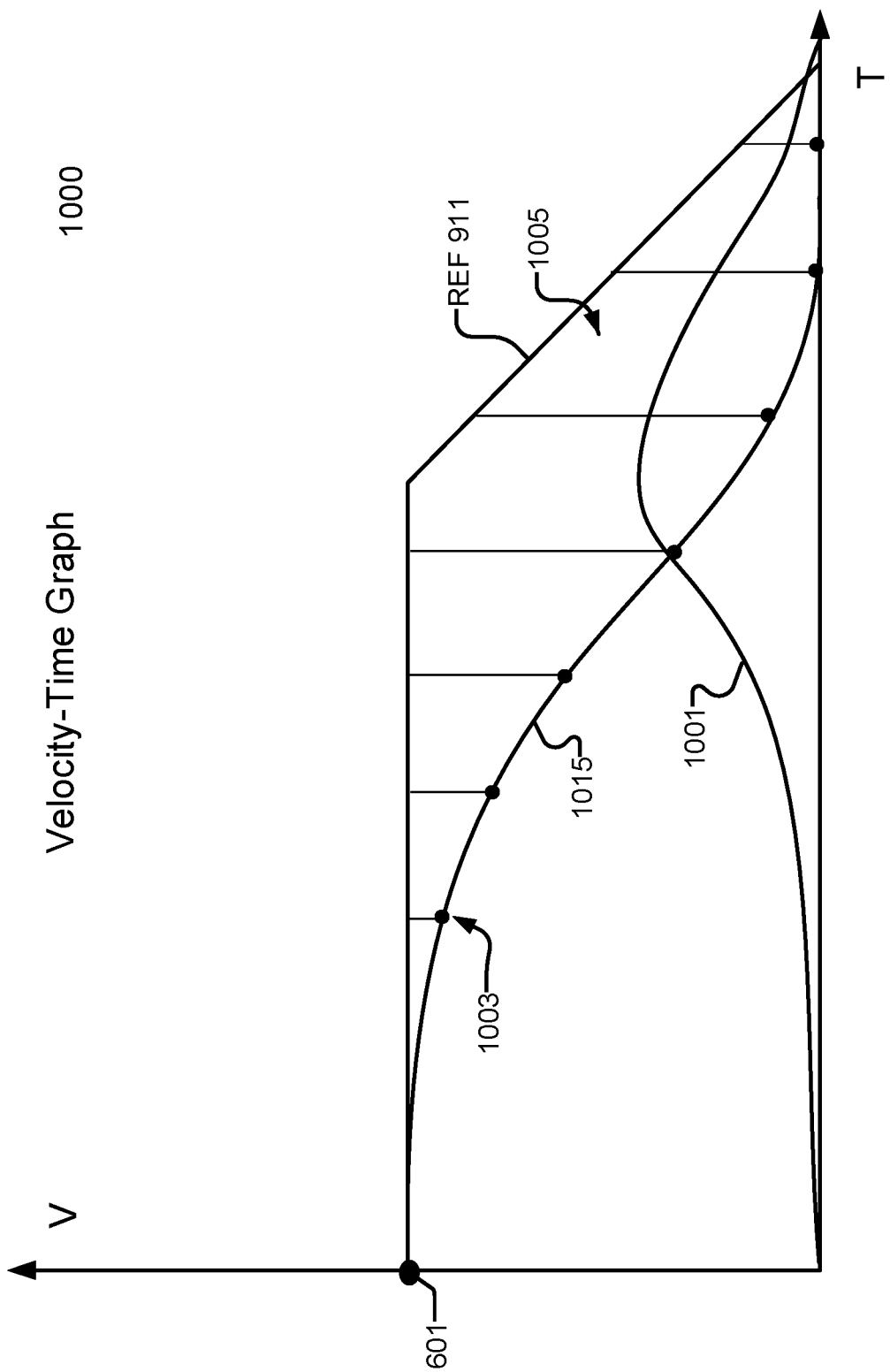
FIG. 10 is an example of a velocity-time graph illustrating an objective evaluation according to one embodiment.

FIG. 10 is an example of a velocity-time graph illustrating an objective evaluation according to one embodiment. Referring to FIG. 10, velocity-time graph 1000 includes velocity-time trajectory 1015 and reference velocity curve 911. Trajectory 1015 may represent trajectory candidate 615 of FIG. 8 in a velocity-time domain. Reference velocity curve 911 may be a reference velocity curve generated for trajectory candidate 615 in view of a stopping point (e.g., red traffic light 506 of FIG. 5).

In one embodiment, objective/rule following cost determiner 709 first computes a difference curve (e.g., curve 1001) based on differences (e.g., 1005) for trajectory 1015 and reference velocity curve 911 at each points (or timestamps) (1003). Velocity values of difference curve 1005 at each of the timestamps are then summed (e.g., square-summed) to be the objective/rule following cost. Here, the objective/rule following cost represents a "closeness" of a trajectory candidate to a reference trajectory.

In one embodiment, considering safety, comfort, objective following, and rule following costs, an overall or total cost function can be: cost_overall=cost_safety*weight_safety+ cost_comfort*weight_comfort+cost_obj*weight_obj. The cost_safety is a safety cost and weight_safety is a weight factor for the safety cost. The cost_comfort is a comfort cost and weight_comfort is a weight factor for the comfort cost. The cost_obj is an objective cost and weight_obj is a weight factor for the objective cost. Note the different weight factors can be numerical values to adjust for an importance of each of the costs relative to the rest of the costs. Once overall costs are computed for each of the trajectory candidates, a best trajectory candidate can be selected based on a lowest overall cost among the trajectory candidates.

Figure 11:
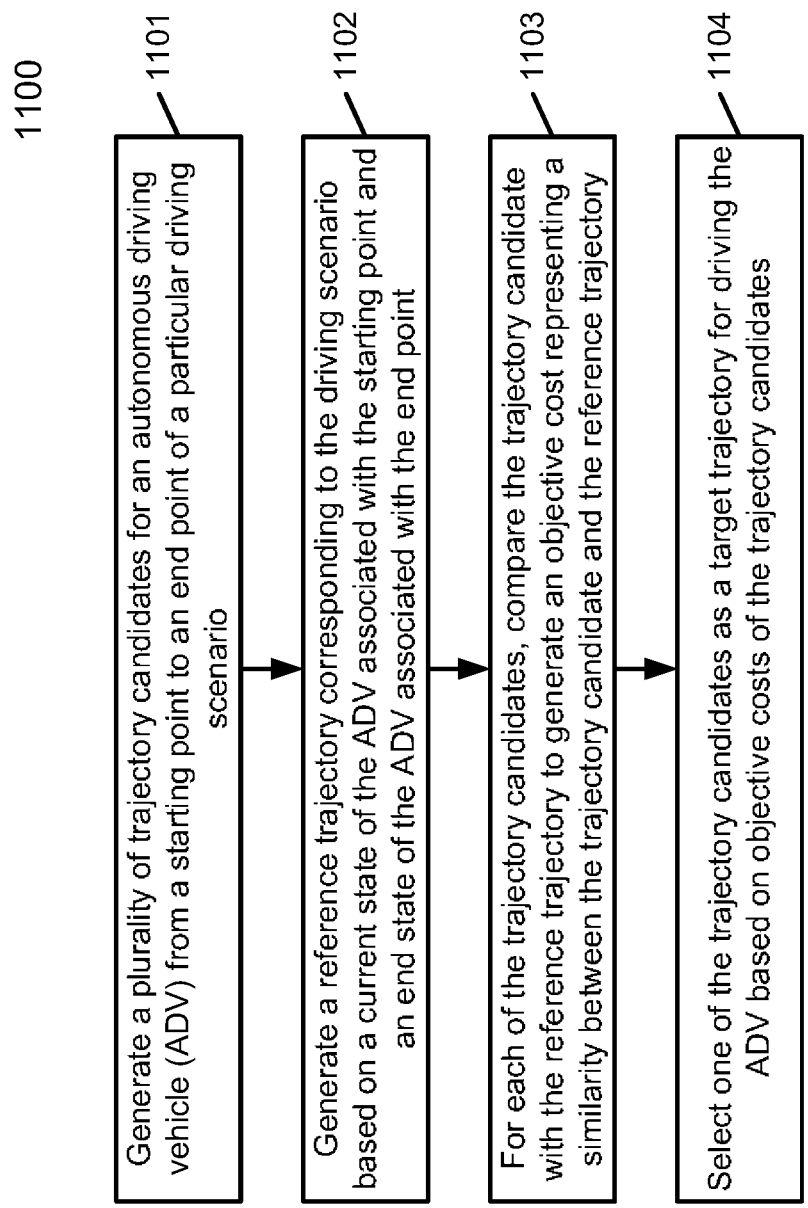
FIG. 11 is a flow diagram illustrating a method performed by an ADV according to one embodiment.

FIG. 11 is a flow diagram illustrating a method performed by an ADV according to one embodiment. Processing 1100 may be performed by processing logic which may include software, hardware, or a combination thereof. For example, process 1100 may be performed by trajectory generation module 308 and/or trajectory evaluation module 309 of FIG. 3A. Referring to FIG. 11, at block 1101, generates a number of trajectory candidates for an autonomous driving vehicle (ADV) from a starting point to an end point of a particular driving scenario. At block 1102, processing logic generates a reference trajectory corresponding to the driving scenario based on a current state of the ADV associated with the starting point and an end state of the ADV associated with the end point, where the reference trajectory is associated with an objective. At block 1103, for each of the trajectory candidates, processing logic compares the trajectory candidate with the reference trajectory to generate an objective cost representing a similarity between the trajectory candidate and the reference trajectory. At block 1104, processing logic selects one of the trajectory candidates as a target trajectory for driving the ADV based on objective costs of the trajectory candidates.

In one embodiment, comparing the trajectory candidate with the reference trajectory includes segmenting the trajectory candidate into a plurality of candidate segments, segmenting the reference trajectory into a plurality of reference segments, for each of the candidate segments, calculating a velocity difference between a velocity of the candidate segment and a velocity of a corresponding reference segment, and calculating the objective cost based on the velocity differences between the candidate segments and reference segments. In another embodiment, the objective cost is calculated by summing squared velocity differences between the trajectory segments and the reference segments.

In one embodiment, for each of the trajectory candidates, processing logic further identifies an obstacle that is closest to the trajectory candidate, measure a distance between the trajectory candidate and the obstacle, calculates a safety cost associated with the trajectory candidate based on the distance between the trajectory candidate and the obstacle, and calculates a total trajectory cost for the trajectory candidate based on the objective cost and the safety cost. The target trajectory can then be selected from the trajectory candidates as having a lowest total trajectory cost.

In one embodiment, for each of the trajectory candidates, processing logic further determines a changing rate of acceleration along the trajectory candidate, calculates a comfort cost for the trajectory candidate based on the changing rate of acceleration along the trajectory candidate, and calculates a total trajectory cost for the trajectory candidate based on the objective cost and the comfort cost. The target trajectory can then be selected from the trajectory candidates as having a lowest total trajectory cost. In another embodiment, calculating a comfort cost for the trajectory candidate includes segmenting the trajectory candidate into a number of candidate segments, for each of the candidate segments, calculating a segment comfort cost for the candidate segment based on a changing rate of an acceleration associated with the candidate segment, and calculating the comfort cost based on the segment comfort costs of the candidate segments. In another embodiment, the comfort cost is calculated based on a sum of segment comfort costs of the candidate segments.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 12:
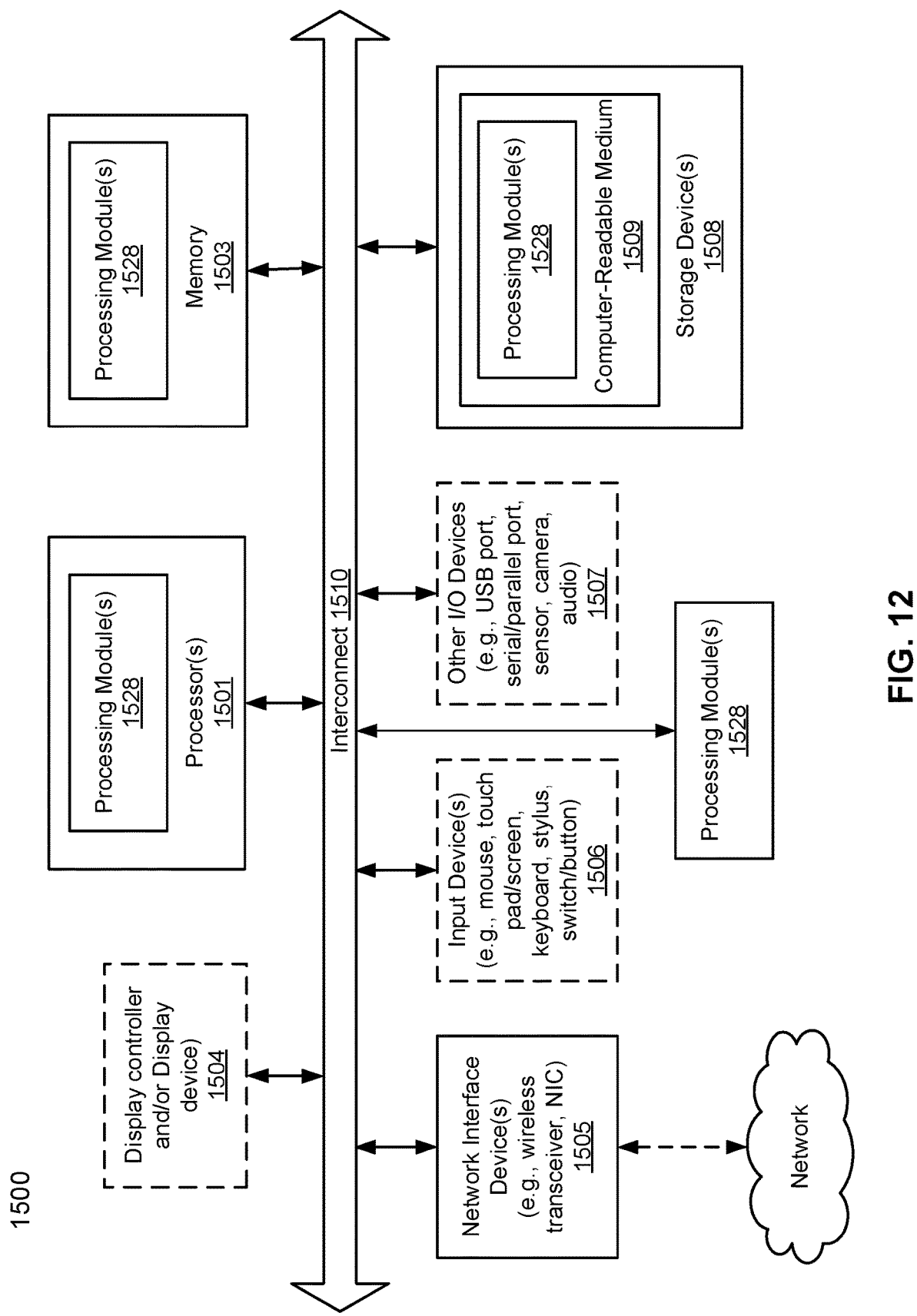
FIG. 12 is a block diagram illustrating a data processing system according to one embodiment.

FIG. 12 is a block diagram illustrating an example of a data processing system which may be used with one embodiment of the disclosure. For example, system 1500 may represent any of data processing systems described above performing any of the processes or methods described above, such as, for example, perception and planning system 110, or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, trajectory generation module 308 and/or trajectory evaluation module 309 of FIG. 3A. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of determining a trajectory to operate an autonomous driving vehicle, the method comprising:
   generating a plurality of trajectory candidates for an autonomous driving vehicle (ADV) from a starting point to an end point of a particular driving scenario;
   generating a reference trajectory corresponding to the driving scenario based on a current state of the ADV associated with the starting point and an end state of the ADV associated with the end point, wherein the reference trajectory is associated with an objective for an amount of time for the ADV to reach the end point;
   for each of the trajectory candidates, comparing velocities of the trajectory candidate with corresponding velocities of the reference trajectory to generate an objective cost representing a similarity between the trajectory candidate and the reference trajectory; and
   selecting one of the trajectory candidates as a target trajectory for driving the ADV based on objective costs of the trajectory candidates.

2. The method of claim 1, wherein comparing velocities of the trajectory candidate with corresponding velocities of the reference trajectory comprises:
   segmenting the trajectory candidate into a plurality of candidate segments;
   segmenting the reference trajectory into a plurality of reference segments;
   for each of the candidate segments, calculating a velocity difference between a velocity of the candidate segment and a velocity of a corresponding reference segment; and
   calculating the objective cost based on the velocity differences between the candidate segments and reference segments.

3. The method of claim 2, wherein the objective cost is calculated by summing squared velocity differences between the candidate segments and the reference segments.

4. The method of claim 1, further comprising:
   for each of the trajectory candidates,
      identifying an obstacle that is closest to the trajectory candidate,
      measuring a distance between the trajectory candidate and the obstacle,
      calculating a safety cost associated with the trajectory candidate based on the distance between the trajectory candidate and the obstacle, and
      calculating a total trajectory cost for the trajectory candidate based on the objective cost and the safety cost; and
   selecting the target trajectory from the trajectory candidates, the target trajectory having a lowest total trajectory cost of the trajectory candidates.

5. The method of claim 1, further comprising:
   for each of the trajectory candidates,
      determining a changing rate of acceleration along the trajectory candidate,
      calculating a comfort cost for the trajectory candidate based on the changing rate of acceleration along the trajectory candidate, and
      calculating a total trajectory cost for the trajectory candidate based on the objective cost and the comfort cost; and
   selecting the target trajectory from the trajectory candidates, the target trajectory having a lowest total trajectory cost of the trajectory candidates.

6. The method of claim 5, wherein calculating a comfort cost for the trajectory candidate comprises:
   segmenting the trajectory candidate into a plurality of candidate segments;
   for each of the candidate segments, calculating a segment comfort cost for the candidate segment based on a changing rate of an acceleration associated with the candidate segment; and
   calculating the comfort cost based on the segment comfort costs of the candidate segments.

7. The method of claim 6, wherein the comfort cost is calculated based on a sum of segment comfort costs of the candidate segments.

8. A non-transitory machine-readable medium having instructions stored therein, which when executed by one or more processors, cause the one or more processors to perform operations, the operations comprising:

generating a plurality of trajectory candidates for an autonomous driving vehicle (ADV) from a starting point to an end point of a particular driving scenario;

generating a reference trajectory corresponding to the driving scenario based on a current state of the ADV associated with the starting point and an end state of the ADV associated with the end point, wherein the reference trajectory is associated with an objective for an amount of time for the ADV to reach the end point;

for each of the trajectory candidates, comparing velocities of the trajectory candidate with corresponding velocities of the reference trajectory to generate an objective cost representing a similarity between the trajectory candidate and the reference trajectory; and selecting one of the trajectory candidates as a target trajectory for driving the ADV based on objective costs of the trajectory candidates.

9. The non-transitory machine-readable medium of claim 8, wherein comparing velocities of the trajectory candidate with corresponding velocities of the reference trajectory comprises:

segmenting the trajectory candidate into a plurality of candidate segments;

segmenting the reference trajectory into a plurality of reference segments;

for each of the candidate segments, calculating a velocity difference between a velocity of the candidate segment and a velocity of a corresponding reference segment; and calculating the objective cost based on the velocity differences between the candidate segments and reference segments.

10. The non-transitory machine-readable medium of claim 9, wherein the objective cost is calculated by summing squared velocity differences between the candidate segments and the reference segments.

11. The non-transitory machine-readable medium of claim 8, further comprising:

for each of the trajectory candidates,
  identifying an obstacle that is closest to the trajectory candidate,
  measuring a distance between the trajectory candidate and the obstacle,
  calculating a safety cost associated with the trajectory candidate based on the distance between the trajectory candidate and the obstacle, and
  calculating a total trajectory cost for the trajectory candidate based on the objective cost and the safety cost; and selecting the target trajectory from the trajectory candidates, the target trajectory having a lowest total trajectory cost of the trajectory candidates.

12. The non-transitory machine-readable medium of claim 8, further comprising:

for each of the trajectory candidates,
  determining a changing rate of acceleration along the trajectory candidate,
  calculating a comfort cost for the trajectory candidate based on the changing rate of acceleration along the trajectory candidate, and
  calculating a total trajectory cost for the trajectory candidate based on the objective cost and the comfort cost; and selecting the target trajectory from the trajectory candidates, the target trajectory having a lowest total trajectory cost of the trajectory candidates.

13. The non-transitory machine-readable medium of claim 12, wherein calculating a comfort cost for the trajectory candidate comprises:

segmenting the trajectory candidate into a plurality of candidate segments;

for each of the candidate segments, calculating a segment comfort cost for the candidate segment based on a changing rate of an acceleration associated with the candidate segment; and calculating the comfort cost based on the segment comfort costs of the candidate segments.

14. The non-transitory machine-readable medium of claim 13, wherein the comfort cost is calculated based on a sum of segment comfort costs of the candidate segments.

15. A data processing system, comprising:

one or more processors; and a memory coupled to the one or more processors to store instructions, which when executed by the one or more processors, cause the one or more processors to perform operations, the operations including generating a plurality of trajectory candidates for an autonomous driving vehicle (ADV) from a starting point to an end point of a particular driving scenario;

generating a reference trajectory corresponding to the driving scenario based on a current state of the ADV associated with the starting point and an end state of the ADV associated with the end point, wherein the reference trajectory is associated with an objective for an amount of time for the ADV to reach the end point;

for each of the trajectory candidates, comparing velocities of the trajectory candidate with corresponding velocities of the reference trajectory to generate an objective cost representing a similarity between the trajectory candidate and the reference trajectory; and selecting one of the trajectory candidates as a target trajectory for driving the ADV based on objective costs of the trajectory candidates.

16. The system of claim 15, wherein comparing velocities of the trajectory candidate with corresponding velocities of the reference trajectory comprises:

segmenting the trajectory candidate into a plurality of candidate segments;

segmenting the reference trajectory into a plurality of reference segments;

for each of the candidate segments, calculating a velocity difference between a velocity of the candidate segment and a velocity of a corresponding reference segment; and calculating the objective cost based on the velocity differences between the candidate segments and reference segments.

17. The system of claim 16, wherein the objective cost is calculated by summing squared velocity differences between the candidate segments and the reference segments.

18. The system of claim 15, further comprising:

for each of the trajectory candidates,
  identifying an obstacle that is closest to the trajectory candidate,
  measuring a distance between the trajectory candidate and the obstacle,
  calculating a safety cost associated with the trajectory candidate based on the distance between the trajectory candidate and the obstacle, and
  calculating a total trajectory cost for the trajectory candidate based on the objective cost and the safety cost; and selecting the target trajectory from the trajectory candidates, the target trajectory having a lowest total trajectory cost of the trajectory candidates.

19. The system of claim 15, further comprising:
for each of the trajectory candidates,
  determining a changing rate of acceleration along the trajectory candidate,
  calculating a comfort cost for the trajectory candidate based on the changing rate of acceleration along the trajectory candidate, and
  calculating a total trajectory cost for the trajectory candidate based on the objective cost and the comfort cost; and
selecting the target trajectory from the trajectory candidates, the target trajectory having a lowest total trajectory cost of the trajectory candidates.

20. The system of claim 19, wherein calculating a comfort cost for the trajectory candidate comprises:
  segmenting the trajectory candidate into a plurality of candidate segments;
  for each of the candidate segments, calculating a segment comfort cost for the candidate segment based on a changing rate of an acceleration associated with the candidate segment; and
  calculating the comfort cost based on the segment comfort costs of the candidate segments.

21. The system of claim 20, wherein the comfort cost is calculated based on a sum of segment comfort costs of the candidate segments.

* * * * *